United States Patent
Bishop et al.

(10) Patent No.: US 9,797,715 B2
(45) Date of Patent: Oct. 24, 2017

(54) GAGE FOR VERIFYING PROFILE OF PART AND METHOD OF VERIFYING PROFILE OF PART

(71) Applicant: Landau Gage, Inc., Windsor (CA)

(72) Inventors: Kenneth Bishop, Belle River (CA); Esrafil Jedari, Windsor (CA); Shanawaz Ali Mohammad, Windsor (CA); Rashid Rashidzadeh, Windsor (CA)

(73) Assignee: Landau Gage, Inc., Windsor (CA)

( * ) Notice: Subject to any disclaimer, the term of this patent is extended or adjusted under 35 U.S.C. 154(b) by 621 days.

(21) Appl. No.: 14/337,395

(22) Filed: Jul. 22, 2014

(65) Prior Publication Data
US 2015/0032413 A1   Jan. 29, 2015

Related U.S. Application Data

(60) Provisional application No. 61/958,224, filed on Jul. 23, 2013.

(51) Int. Cl.
*G01B 11/24* (2006.01)

(52) U.S. Cl.
CPC ................ *G01B 11/2408* (2013.01)

(58) Field of Classification Search
CPC ..... G01B 5/201; G01B 7/282; G01B 11/2408
See application file for complete search history.

(56) References Cited

U.S. PATENT DOCUMENTS

| | | | |
|---|---|---|---|
| 4,166,323 A | 9/1979 | Maag | |
| 4,337,580 A | 7/1982 | Tanno et al. | |
| 5,499,194 A | 3/1996 | Prestidge et al. | |
| 5,694,339 A * | 12/1997 | Ishitoya | G05B 19/401 33/503 |
| 5,712,706 A | 1/1998 | Castore et al. | |
| 5,761,067 A | 6/1998 | Alford et al. | |
| 5,815,593 A | 9/1998 | Shaum et al. | |
| 6,163,973 A | 12/2000 | Matsumiya et al. | |
| 6,175,813 B1 * | 1/2001 | Purchase | G01B 7/12 33/555.1 |
| 6,980,301 B2 | 12/2005 | Kajitani et al. | |
| 7,188,054 B2 | 3/2007 | Kadowaki et al. | |

(Continued)

FOREIGN PATENT DOCUMENTS

| | | |
|---|---|---|
| EP | 1574818 | 9/2005 |
| WO | 2007122362 | 11/2007 |
| WO | 2009141838 | 11/2009 |

*Primary Examiner* — Hyun Park
*Assistant Examiner* — Liam R Casey
(74) *Attorney, Agent, or Firm* — Bejin Bieneman PLC

(57) ABSTRACT

A method of verifying the roundness of a clutch hub includes placing the clutch hub adjacent a non-contact measuring device. The method includes rotating one of the clutch hub and non-contact measuring device about a central axis that is stationary relative to the non-contact measuring device. Distance measurements are measured between the non-contact measuring device and a surface of the clutch hub at discrete points along splines and slopes between the splines of the clutch hub as the clutch hub is rotated about the central axis. The method includes identifying some of the distance measurements as spline measurements associated with splines of the clutch hub. The roundness of the clutch hub is calculated based on the spline measurements.

16 Claims, 12 Drawing Sheets

(56) References Cited

U.S. PATENT DOCUMENTS

| | | |
|---|---|---|
| 7,286,949 B2 | 10/2007 | McFarland et al. |
| 7,327,857 B2 | 2/2008 | Lloyd, Jr. et al. |
| 7,420,588 B2 | 9/2008 | Asano et al. |
| 7,464,481 B2 | 12/2008 | Ishikawa |
| 7,755,771 B2 | 7/2010 | Komori et al. |
| 7,792,653 B2 | 9/2010 | Grupp et al. |
| 8,240,210 B2 | 8/2012 | Wu et al. |
| 8,411,283 B2 | 4/2013 | Maschirow et al. |
| 2003/0177850 A1* | 9/2003 | Whittington ........... G01B 17/06 73/865.8 |
| 2007/0222133 A1* | 9/2007 | Sammartin ............ B23Q 3/183 269/139 |
| 2011/0080588 A1 | 4/2011 | Segall |

* cited by examiner

GAGE FOR VERIFYING PROFILE OF PART AND METHOD OF VERIFYING PROFILE OF PART

CROSS-REFERENCE TO RELATED APPLICATIONS

The subject patent application claims priority to and all the benefits of U.S. Provisional Patent Application No. 61/958,224 filed on Jul. 23, 2013, which is herein incorporated by reference in its entirety.

BACKGROUND

1. Field

The subject application is related to a method of verifying the roundness of a part, such as a clutch hub. The subject application is also related to a gage for verifying the roundness of the part.

2. Description of the Related Art

During a manufacturing process, sample parts may be routinely removed from the manufacturing line and measured to ensure that selected dimensions fall within required tolerances. One method of measuring parts includes the use of a touch probe of a coordinate measuring machine (CMM). Specifically, the touch probe is contacted with selected surfaces of the part. Such a process can be time consuming and, in fact, can take as much as 10-20 minutes for a part such as a clutch hub. During the entire time that the part is being measured, additional parts are being continuously manufactured on the manufacturing line. As such, if it is determined that the part is not within tolerance after the 10-20 minute measuring process, then the parts that were manufactured during that 10-20 minute are likely also not within tolerance and thus are scrapped, which is economically disadvantageous.

As one example, vehicle drivetrain components, e.g., automotive transmission components such as clutch hubs, are subject to strict tolerance requirements. Such components may include outer splines and inner splines and the roundness of the part along these splines must be within specific tolerances. As such, several data points are taken for these splines with a touch probe and the roundness is calculated from these data points. Slopes between the outer splines and the inner splines, and designed ridges in the outer splines and/or inner splines, are specifically not measured with the touch probe because such data points would interfere with the roundness calculation. This process is time consuming and is subject to operator error by requiring the operator to only touch the touch probe to the outer splines and inner splines without touching the slopes or designed ridges.

Thus, there remains an opportunity to develop a measurement device and method for quickly and effectively measuring a surface dimension of a part.

SUMMARY AND ADVANTAGES

A method of verifying the roundness of a clutch hub includes placing the clutch hub adjacent a non-contact measuring device. The method includes rotating one of the clutch hub and non-contact measuring device. The method includes measuring distance measurements between the non-contact measuring device and a surface of the clutch hub at discrete points along splines and slopes between the splines of the clutch hub as one of the clutch hub and non-contact measuring device is rotated. The method includes identifying some of the distance measurements as spline measurements associated with splines of the clutch hub. The method includes calculating roundness of the clutch hub based on the spline measurements.

Accordingly, the clutch hub may be quickly and easily measured by measuring distance measurements along both the splines and the slopes without the need to distinguish between splines and slopes during the measurement of the distance measurements. Once the distance measurements are measured, the spline measurements are identified and used to calculate the roundness of the clutch hub. Since the splines and slopes are not distinguished while the distance measurements are measured, the distance measurements may be quickly measured, thus decreasing the time and complexity of the verification. Due to the reduction in time and complexity, the roundness of a more frequent sampling of clutch hubs may be verified during a production run of clutch hubs to provide greater quality assurance.

BRIEF DESCRIPTION OF THE DRAWINGS

Other advantages will be readily appreciated, as the same becomes better understood by reference to the following detailed description when considered in connection with the accompanying drawings wherein.

DETAILED DESCRIPTION

With reference to the Figures, wherein like numerals indicate like parts throughout the several views, a gage 10, i.e., a gage 10, for verifying the roundness of a part 12, such as a clutch hub, is generally shown. The gage 10 measures a surface dimension of the part 12 and compares the surface dimension of the part 12 to predetermined dimensional tolerances to determine whether the part 12 is acceptable, i.e., within the predetermined dimensional tolerances, or unacceptable, i.e., outside the predetermined dimensional tolerances.

For example, the gage 10 shown in the Figures is configured to measure an outer surface of the part 12 to determine the roundness, run-out, and/or concentricity of the outer surface. Alternatively, the gage 10 can be configured to measure any surface of the part 12, e.g., inner surface, outer surface, etc., and any dimension of that surface, e.g., roundness, flatness, curve, RMS roundness, sector roundness, concentricity, eccentricity, eccentric angle, centre X, centre Y, average diameter, least square circle, maximum diameter, minimum diameter, minimum inscribed, and/or maximum circumscribed, etc. The part 12 shown in the Figures, and specifically in FIGS. 1-4, is a component of an automotive drivetrain such as the clutch hub, i.e., a clutch housing. However, it should be appreciated that the part 12 may be any type of part.

Figure 1:
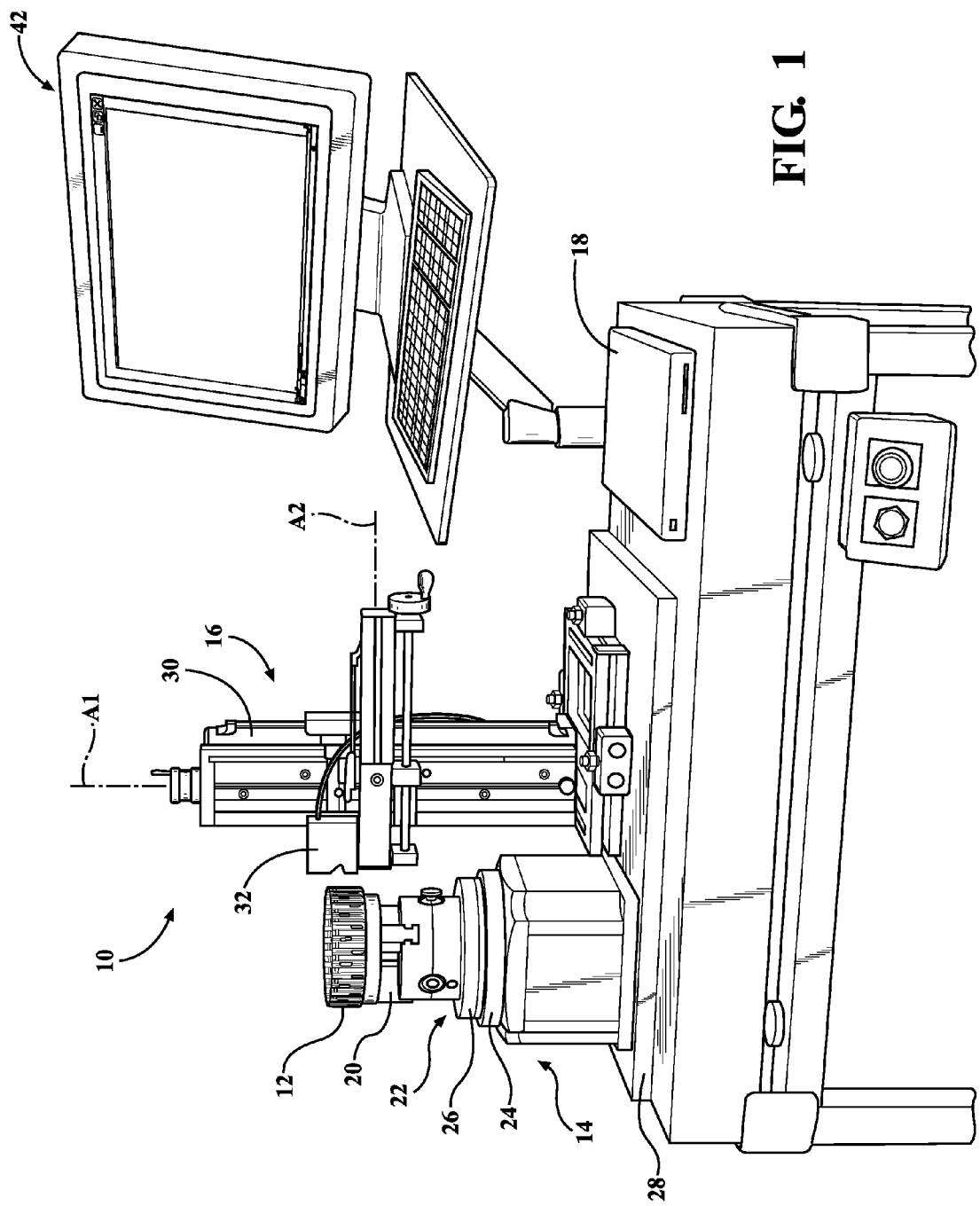
FIG. 1 is a perspective view of a gage for verifying roundness of a part such a clutch hub mounted to the gage.
Figure 2:
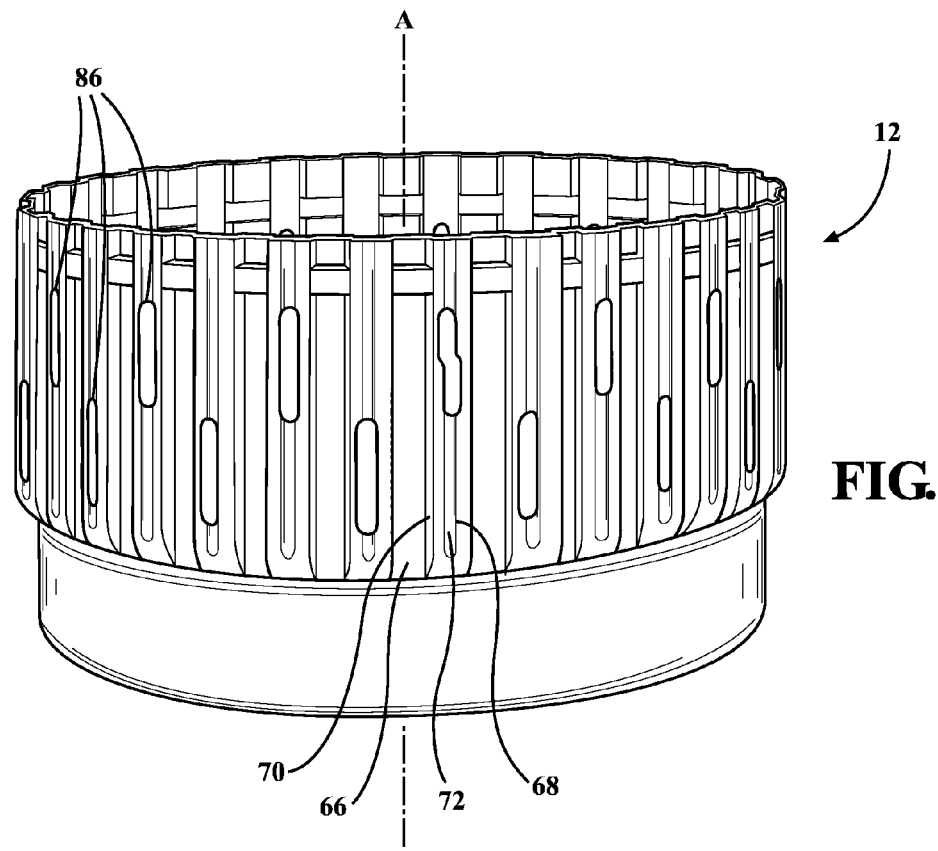
FIG. 2 is a perspective view of the clutch hub.
Figure 4:
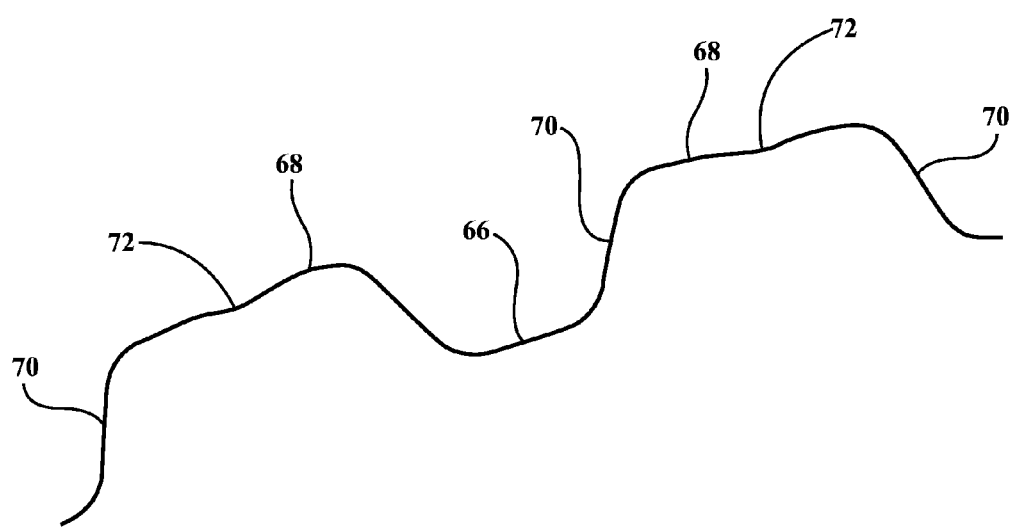
FIG. 4 is a magnified view of a portion of the clutch hub.
Figure 3:
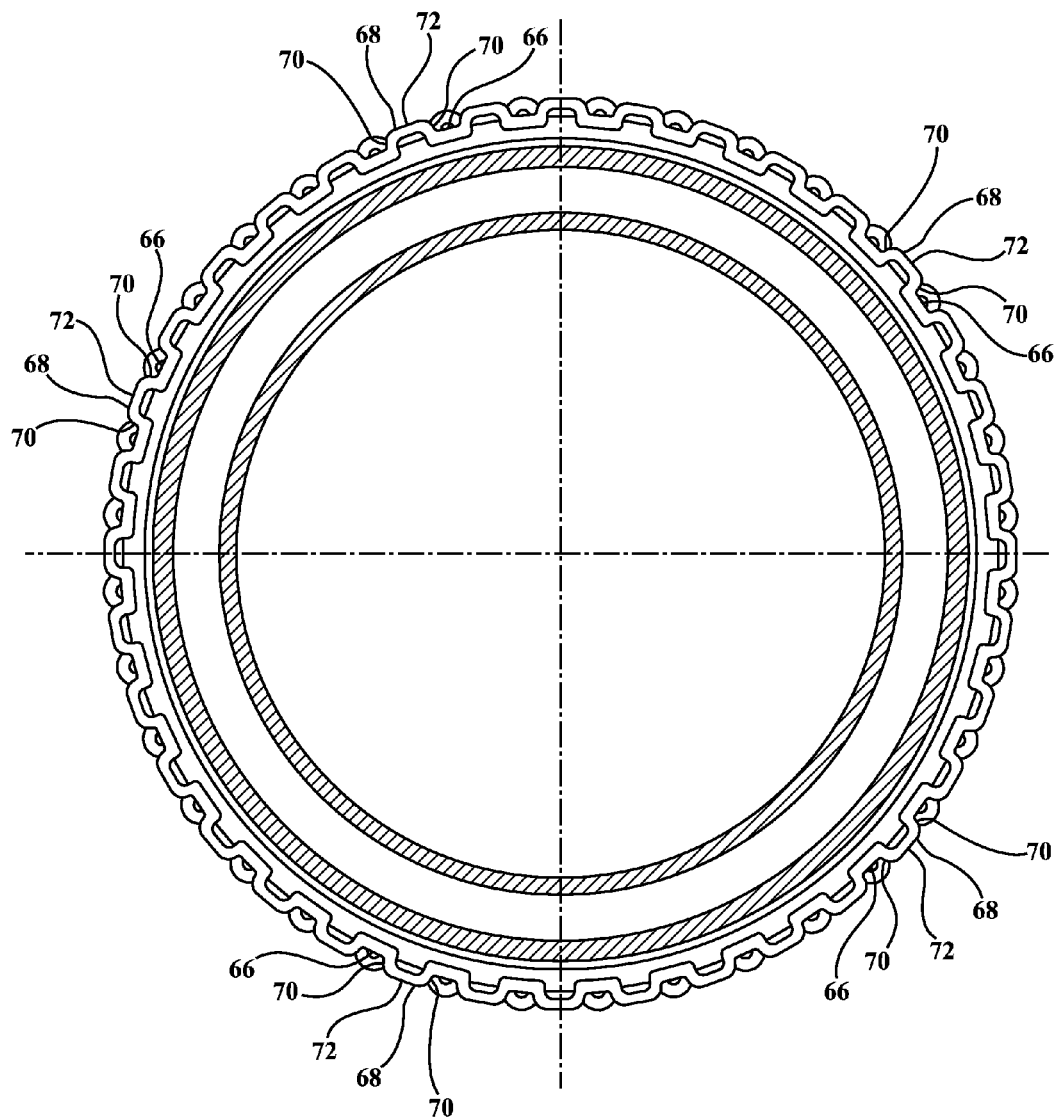
FIG. 3 is a top view of the clutch hub to identify the splines and slopes of the clutch hub.

With reference to FIG. 1, the gage 10 includes a stage 14 for supporting the part 12, a non-contact measuring apparatus 16 that reads distance measurements of the surface dimension of the part 12, and a computer 18 coupled to at least one of the stage 14 and the measuring apparatus 16 for receiving the distance measurements. The non-contact measuring apparatus 16 may include, for example, a non-contact measuring device 32, e.g., a laser sensor, as set forth further below.

With reference to FIGS. 1-4, the non-contact measuring device 32 measures distance measurements (graphically shown as elements 78 in FIGS. 7-9) between the non-contact measuring device 32 and a surface of the part 12, e.g., the clutch hub, at discrete points along splines 66, 68 and slopes 70 between the splines 66, 68. The gage 10, e.g., the computer 18, identifies some of the distance measurements as spline measurements (graphically shown as elements 80 in FIGS. 8 and 9) associated with the splines 66, 68. The computer 18 also identifies the distance measurements other than the spline measurements as unnecessary measurements, i.e., the data points deleted between the spline measurements in FIG. 8 as compared to FIG. 7. The unnecessary measurements may be associated with slopes 70 between inner splines 66 and outer splines 68, designed ridges 72, and holes 86.

The gage 10, i.e., the computer 18, may then calculate roundness of the part 12, e.g., the clutch hub 18, based on the spline measurements. In other words, the computer 18 does not use the unnecessary measurements, i.e., the measurements that are not associated with the splines 66, 68, to calculate the roundness of the part 12. As set forth below, inner spline measurements (graphically shown as elements 82 in FIG. 8) associated with an inner spline 66 may be used to calculate the inner spline roundness of the inner spline 66. Likewise, outer spline measurements (graphically shown as elements 84 in FIGS. 8 and 9) associated with the outer spline 68 may be used to calculate the outer spline roundness of the outer spline 68.

The gage 10 includes may include means, e.g., the computer 18 programmed with the filtering software described below, for performing any step of calculating the roundness of the part based on the distance measurements set forth herein. For example, the gage 10 may include means for comparing the difference between consecutive distance measurements with a threshold range and categorizing consecutive distance measurements having a distance outside of threshold range as unnecessary measurements. Specifically, the means for comparing and categorizing may be the computer 18, as set forth below, programed with the filtering software discussed below.

The gage 10 may include means, e.g., the computer 18 programed with the filtering software, for eliminating distance measurements other than the spline measurements. Specifically, the gage 10 may include means, e.g., the computer 18 programed with the filtering software, for comparing the difference between consecutive distance measurements with a threshold range and categorizing consecutive distance measurements having a distance outside of threshold range as unnecessary measurements.

With reference to FIG. 1, the stage 14 may include a rotary turntable 22 and a chuck 20 on the rotary turntable 22 for engaging the part 12. The rotary turntable 22 may include a stationary base 24 and a rotatable platform 26 that is rotatable relative to the base 24 and supports the chuck 20. The rotary turntable 22 can be, for example, of the type commercially available from Aerotech Inc. of Pittsburgh, Pa., USA under the name APR200DR-155. The stationary base 24 may be mounted to a table 28, as discussed further below. The rotary turntable 22 may include a controller.

The chuck 20 may be configured to releasably engage the part 12. The chuck 20 may be configured to be adjustable to releasably engage several different parts 12 having varying sizes. With reference to FIG. 1, the chuck 20, for example, may be a mechanical jaw chuck 20 that includes jaws that are moveable radially for engaging/disengaging the part 12. Alternatively, the chuck 20 may be any type of device for releasably holding the part 12 on the rotary turntable 22.

With continued reference to FIG. 1, the measuring apparatus 16 includes a stand 30 and a non-contact measuring device 32 mounted to the stand 30. The stand 30 is mounted to the table 28. As shown in FIG. 1, the measuring apparatus 16 is typically spaced from the stage 14 and the non-contact measuring device 32 is spaced from the part 12 and the stage 14, i.e., does not contact the part 12 or the stage 14, during measuring.

The stand 30 is adjustable to adjust the position of the non-contact measuring device 32 relative to the part 12 to accommodate parts 12 of varying size. Specifically, the stand 30 is linearly adjustable along two axes A1, A2, and more specifically, vertically and toward/away from the part 12. The stand 30 can include meters 34 for measuring the adjustment of the non-contact measuring device 32 along the two axes A1, A2.

In an alternative embodiment not shown in the Figures, the stand 30 includes motorized segments that are adjustable by the computer 18. In such a configuration, the computer 18 is programmed with dimensions of several parts 12 of varying size each having a unique identifier. The user inputs the identifier into the computer 18 and the computer 18 instructs the motorized segments of the stand 30 to automatically adjust to accommodate the identified part 12.

The non-contact measuring device 32 is configured to measure distance measurements between the non-contact measuring device 32 and the part 12. The non-contact measuring device 32 may be connected to the computer 18 to transfer the measurements from the non-contact measuring device 32 to the computer 18. The non-contact measuring device 32 may be a laser sensor, as shown in FIG. 1. The laser sensor may be a displacement triangulation laser. For example, the non-contact measuring device 32 may be of the type commercially available from Keyence Corporation of Osaka, Japan under the name LK-H022. Alternatively, the non-contact measuring device 32 may be any type of displacement laser or confocal light.

One of the stage 14 and the non-contact measuring device 32 may be configured to provide relative rotation between the part 12 and the non-contact measuring device 32 for measuring distance measurements about the part 12, e.g. the clutch hub. Specifically, at least one of the stage 14 and the non-contact measuring device 32 rotates relative to the other to move the surface of the part 12 relative to the non-contact measuring device 32 for measurement of the surface dimension of the part 12. For example, in the embodiment shown in the Figures, the non-contact measuring device 32 remains stationary and the stage 14 rotates the part 12 relative to the non-contact measuring device 32 about a central axis A of the part 12. In an alternative configuration not shown in the Figures, for example, the measuring apparatus 16 and/or the non-contact measuring device 32 can be configured to rotate around the part 12.

Figure 5:
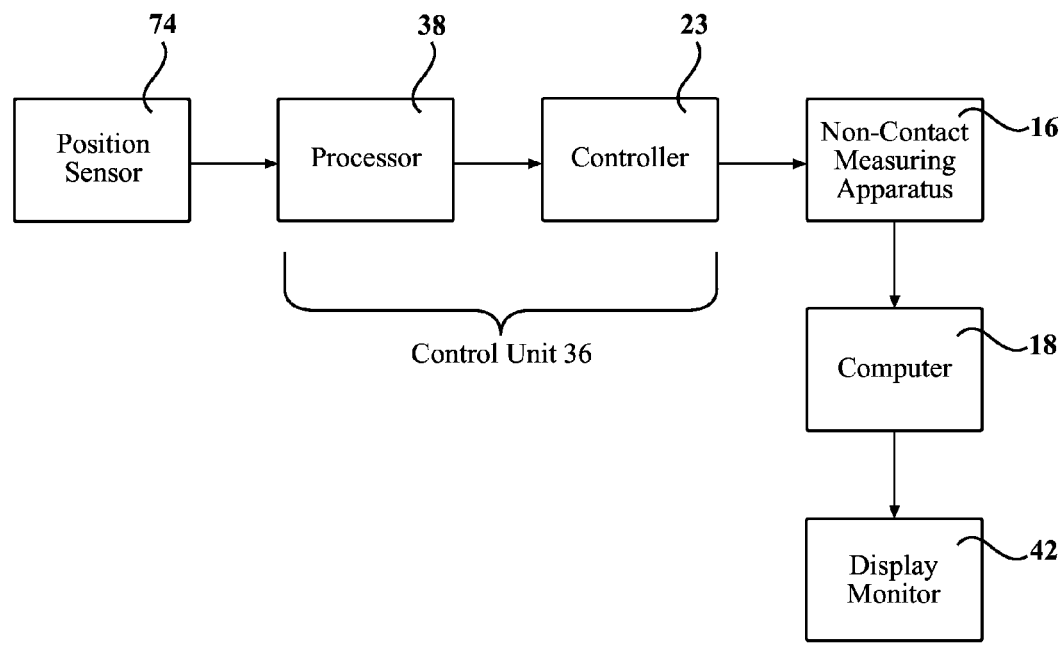
FIG. 5 is a block diagram of a portion of the gage.

The non-contact measuring device 32 takes distance measurements at discrete points along the surface of the part 12. The gage 10 includes a control unit 36, as shown in FIG. 5, coupled to the non-contact measuring device 32 for controlling the frequency of measurement readings. Specifically, the stage 14 includes a position sensor 74 in communication with the control unit 36 for monitoring the rotational position of the part 12 relative to the position sensor 74. The non-contact measuring device 32 reads measurements based on the rotational position of the part 12.

The position sensor 74 senses relative rotation between the rotatable platform 26 and the stationary base 24 of the rotary turntable 22. The control unit 36 instructs the non-contact measuring device 32 to read a measurement at equally spaced intervals along the surface of the part 12 based on measurements by the positions sensor 74. The position sensor 74, for example, is an optical encoder coupled to the rotatable platform 26 and the stationary base 24.

With reference to FIG. 5, the control unit 36 may include a processor 38 in communication with the position sensor 74 and a controller 23 in communication with the processor 38 and the non-contact measuring device 32. At pre-selected intervals measured by the position sensor, the position sensor 74 may send a signal to the processor 38. In response to the signal, the processor 38 instructs the controller 23 to operate the non-contact measuring device 32 to make a measurement. When the measurement is read, the non-contact measuring device 32 may send the measurement to the computer 18. For example, the non-contact measuring device 32 may save all measurements and subsequently transfers all measurements to the computer 18 in a single batch. The processor 38, for example, is a programmable logic controller (PLC).

Figure 7:
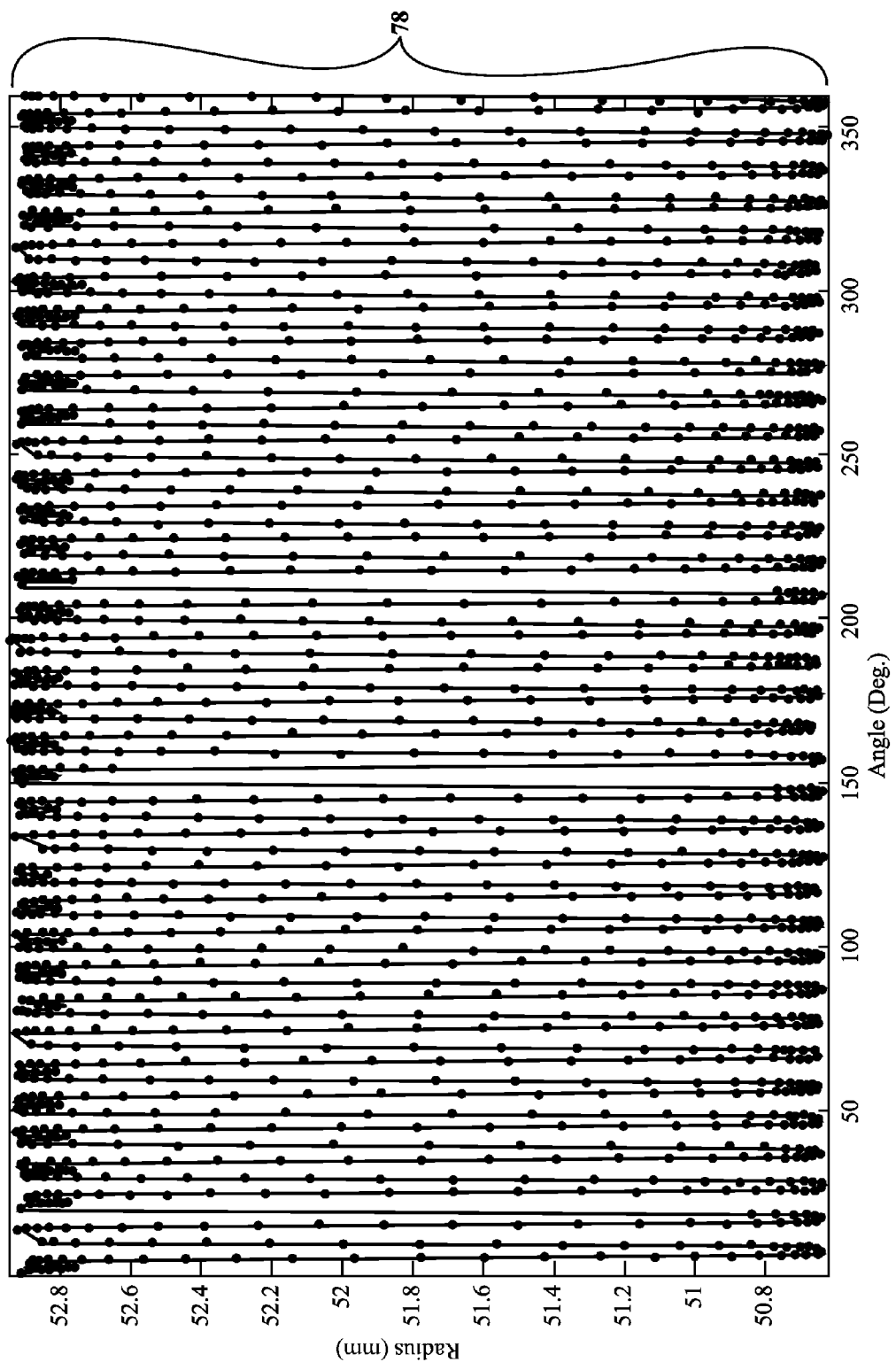
FIG. 7 is a graph of an example of distance measurements for a clutch hub.

The position sensor 74, for example, may be configured to send a signal to the processor 38, as set forth above, at every 0.1 degrees of rotation of the rotary turntable 22 relative to the stationary base 24. The rotary turntable 22 rotates the part 12 in 360 degrees. As such, the sensor reads 3600 distance measurements (identified with element number 78 in FIG. 7) around the perimeter of the part 12. These 3600 measurements for a part 12, e.g., a clutch housing, is shown in FIG. 7, for example. However, it should be appreciated that the position sensor 74 can be configured to take any number of readings at any suitable interval.

As set forth above, the computer 18 receives the measurement from the non-contact measuring device 32. The computer 18 includes filtering software that compiles all of the distance measurements and filters the distance measurements to a filtered data set, as set forth below. The computer 18 also includes dimensional software for analyzing a dimension of the part 12 based on the filtered data set from the filtering software. The dimensional software, for example, can be configured to analyze the roundness of the part 12, such as the clutch hub shown in the Figures. The dimensional software, for example, is that commercially available from Digital Metrology Solutions, Inc. of Columbus, Ind., USA under the name OmniRound. However, the filtering software and the dimensional software be combined into a single software program.

The computer 18 may be of any suitable type and may include any suitable hardware, software, and operating system. The computer 18 is configured to perform any step of calculating the roundness of the part based on the distance measurements set forth herein. For example, the computer 18 is programmed with the filtering software described herein. Specifically, the computer 18 may be configured to identify some of the distance measurements as spline measurements associated with the splines 66, 68 of the part 12, e.g., the clutch hub, and calculate roundness of the clutch hub based on the spline measurements. For example, the computer 18 may be programed with the filtering software to perform the steps discussed below.

The computer 18 may be configured, e.g., programed with the filtering software to perform the steps discussed below, to eliminate distance measurements other than the spline measurements. The computer 18 may be configured, e.g., programed with the filtering software to perform the steps discussed below, to compare the difference between consecutive distance measurements with a threshold range and categorize consecutive distance measurements having a distance outside of threshold range as unnecessary measurements. The computer 18 may be configured, e.g., programed with the filtering software to perform the steps discussed below, to eliminate the unnecessary measurements from the spline measurements.

Figure 6:
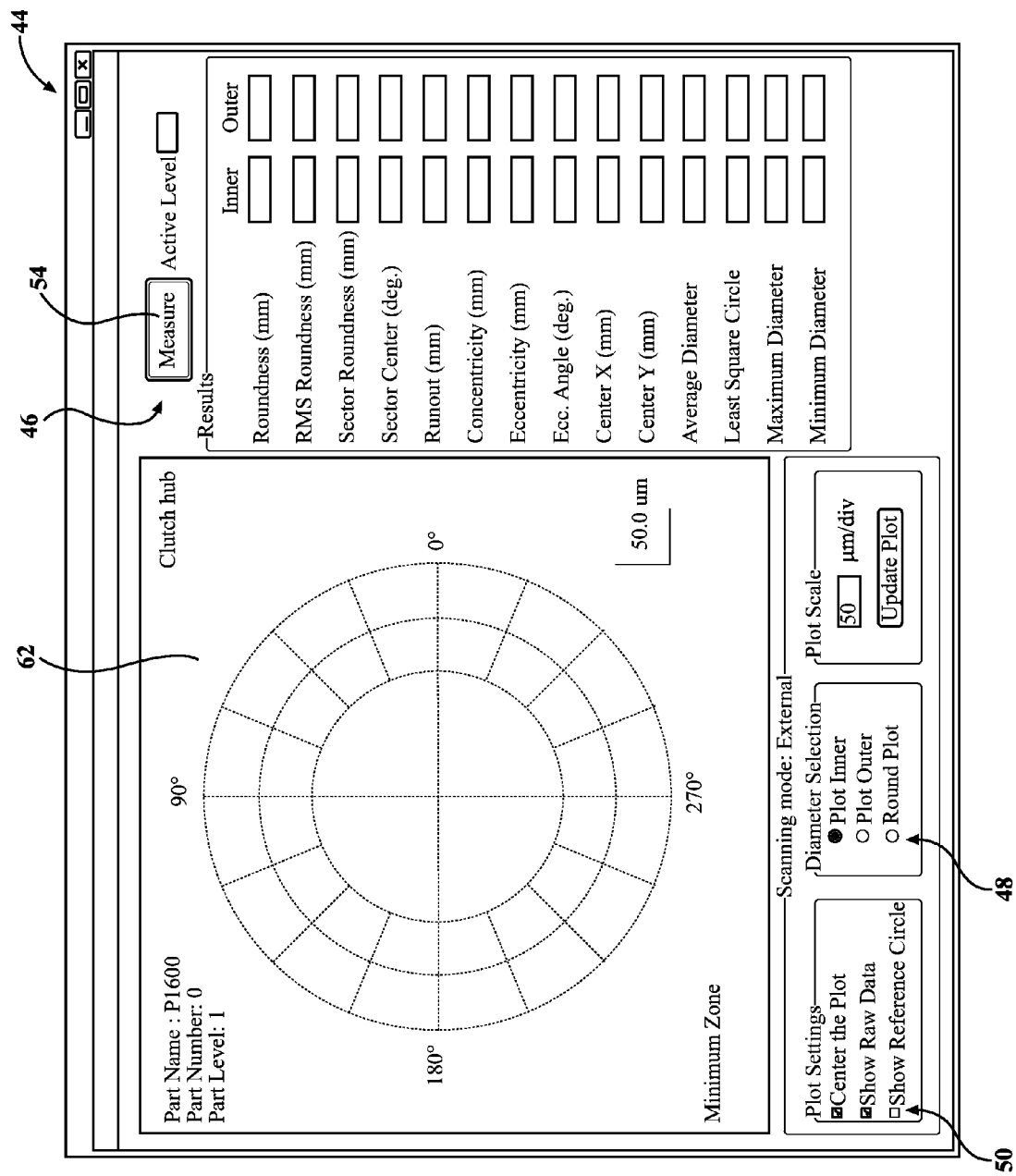
FIG. 6 is a display area for displaying data associated with the verification of the roundness of the clutch hub.

With reference to FIGS. 1 and 6, the gage 10 may include a display monitor 42 in communication with the computer 18 for displaying data. The display monitor 42 displays a graphical user interface 44 for operating the software, as set forth further below. The graphical user interface 44 is controlled with a mouse, keyboard, etc. The control unit 36 is shown in FIG. 5 as being separate from the computer 18. Alternatively, the control unit 36 may be a component of the computer 18.

The graphical user interface 44 is shown in FIG. 6. The graphical user interface 44 includes several push buttons 46, radio buttons 48, and check boxes 50. The push buttons 46 include a "Measure" push button 54 to initiate a method of verifying the roundness of the clutch hub. The graphical user interface 44 may include a prompt for entry of a part name, part number, etc., for identifying the type of part 12 being verified. With continued reference to FIG. 6, the graphical user interface 44 includes a display area 62 for displaying the measurements of the part 12.

As set forth above, the stage 14 and the measuring apparatus 16 are mounted to the table 28. The computer 18 and the control unit 36 are supported on the table 28 as shown in FIG. 1. The table 28 may be a vibration resistant table 28. A top of the table 28 can be granite to aid in the absorption of vibration.

With reference to FIGS. 10-14, the method verifying the roundness of the part 12, e.g., the clutch hub, is set forth below. For example, this method includes measuring and analyzing dimensions of a surface of the part 12, e.g., roundness, using the gage 10. The method includes placing the part 12, e.g., the clutch hub, adjacent the non-contact measuring device, as shown in block 100 of FIG. 10. Specifically, the part 12 is engaged with the stage 14. In particular, the chuck 20 is adjusted to receive the part 12, the part 12 is inserted into the chuck 20, and the chuck 20 is adjusted to clamp the part 12. The method also includes adjusting the position of the non-contact measuring device 32 relative to the part 12, if necessary.

The method includes initiating the measurement. Specifically, the user powers the rotary turntable 22, e.g., by selecting the "Measure" push button 54 on the graphical user interface 44, which initiates rotation of the rotary turntable 22. Alternatively, the user may initiate the measurement by flipping a switch, to initiate rotation of the rotary turntable 22 relative to the stationary base 24 and the associated data collection.

Figure 10:
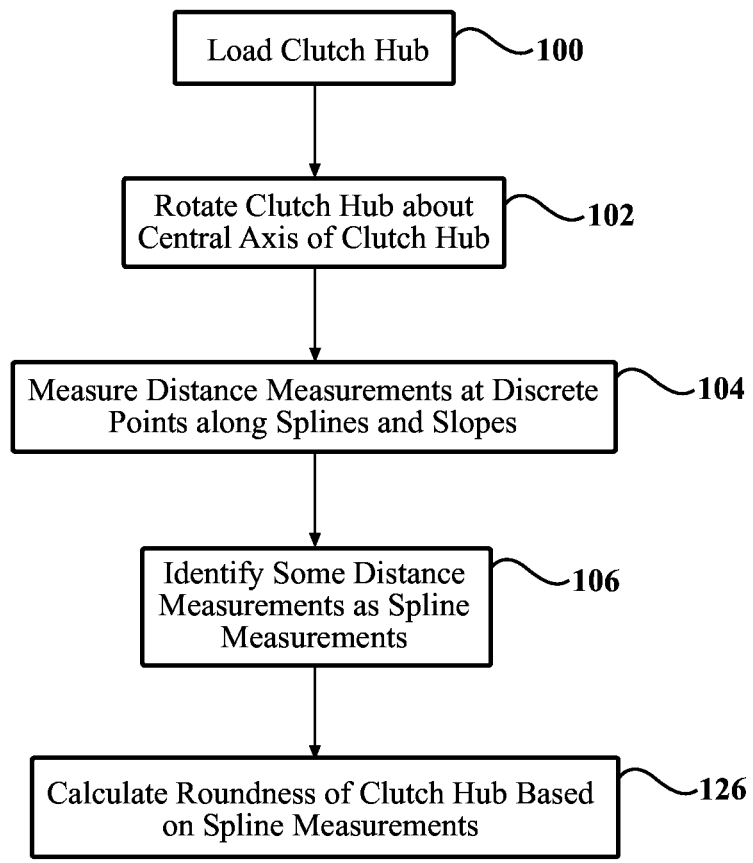
FIG. 10 is a flow chart of a method of verifying the roundness of the clutch hub.

The method includes rotating one of the part 12, e.g., the clutch hub, and non-contact measuring 32 device about the central axis A of the part 12, as shown in block 102 of FIG. 10. The method includes tracking the rotational position of the part 12 on the stage 14, e.g., by monitoring the rotational position of the rotary turntable 22 relative to the stationary base 24 with the rotary encoder. The method includes sending a signal from the stage 14, e.g., the rotary encoder, to the control unit 36, e.g., the processor 38, at predetermined rotational intervals. For example, the method includes sending a signal from the stage 14 to the control unit 36 at every 0.1 degree of rotation of the rotary turntable 22 relative to the stationary base 24.

The method includes measuring distance measurements between the non-contact measuring device 32 and a surface of the part 12, e.g., the clutch hub, at discrete points along splines 66, 68 and slopes 70 between the splines 66, 68 as the part 12, e.g., the clutch hub, is rotated about the central axis A, as shown at block 104 of FIG. 10. The distance measurements may be measured at evenly spaced intervals of rotation of the part 12, e.g., the clutch hub, such as at every 0.1 degree of rotation as set forth above. Specifically, the method may include operating the non-contact measuring device 32 based on the signals received by the processor 38 from the stage 14. In particular, the method may include instructing the controller 23 with the processor 38 to instruct the non-contact measuring device 32 to read a measurement in response to every signal received by the processor 38 from the stage 14.

The part 12, e.g., the clutch hub, may be rotated 360 degrees and the distance measurements may be measured during 360 degrees of rotation of the part 12 about the central axis A, as shown graphically in FIG. 7. In other words, distance measurements at discrete points along an entire periphery of the part may be measured. Alternatively, distance measurements may be taken along only a predetermined portion of the part 12.

The part 12, e.g., the clutch hub, may be continuously rotated during measurement of the distance measurements. In other words, the part 12 may be rotated at a constant rotational speed and the distance measurements may be measured as the part 12 rotates. Alternatively, the rotation of the part 12 may be slowed or stopped for each distance measurement.

The method includes communicating each measurement reading from the non-contact measuring device 32 to the filtering software programmed to the computer 18. Typically, the non-contact measuring device 32 saves each distance measurement during the reading and communicates all data points together to the filtering software. Alternatively, the non-contact measuring device 32 may communicate individual distance measurements to the filtering software one data point at a time. The method includes displaying the distance measurements on the graphical user interface 44.

With continued reference to FIGS. 10-14, the method includes filtering the distance measurements with the filtering software. In particular, the filtering software applies an algorithm to distance measurements to filter unnecessary measurements and spline measurements. The method includes removing distance measurements associated with the slopes 70, designed ridges 72, and holes 84, along with abnormal readings that exceed a calculated reference distance with the filtering software. For example, the filtering software analyzes consecutive distance measurements in series and compares that series to distance measurements before and after the series to identify extreme outliers, i.e., unnecessary measurements, that are not associated with the inner spline 66 or the outer spline 68. The filtering software eliminates these unnecessary measurements.

Specifically, with reference to FIG. 10, the method includes identifying some of the distance measurements as spline measurements associated with splines 66, 68, as shown in block 106 of FIG. 10, and identifying some of the distance measurements as unnecessary measurements. As one example, after identifying some of the measurements as spline measurements, the method may identify the distance measurements other than the spline measurements as unnecessary measurements. The calculation of the roundness of the clutch hub is based on the spline measurements.

Figure 11:
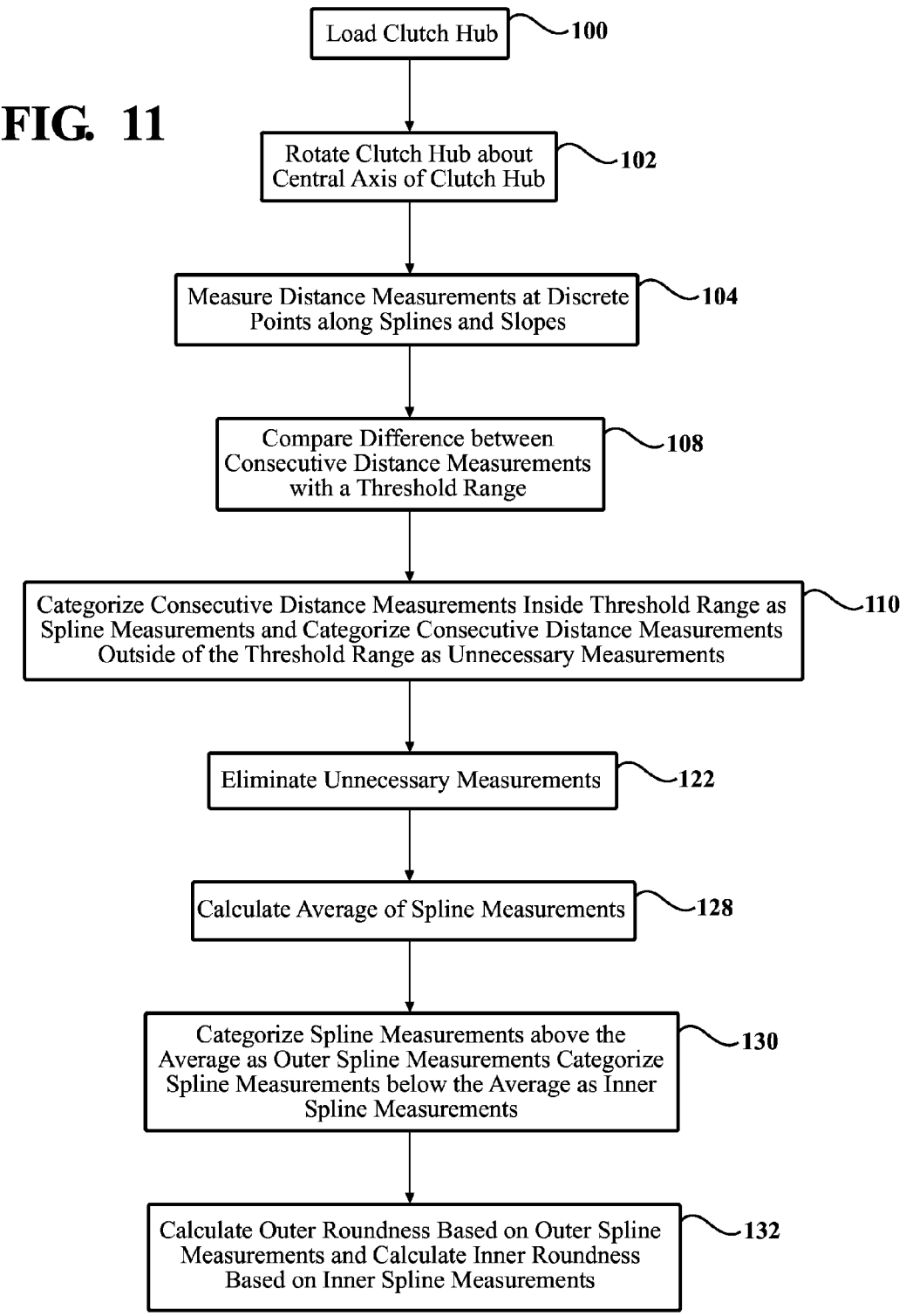
FIG. 11 is another flow chart of the method of verifying the roundness of the clutch hub.

With reference to FIG. 11, the step of identifying some distance measurements as spline measurements, as shown in block 106 of FIG. 10, may include comparing the difference between consecutive distance measurements with a threshold range, as shown in block 108. The method includes categorizing consecutive distance measurements having a difference outside of threshold range as unnecessary measurements and categorizing consecutive distance measurements within the threshold range as spline measurements, as shown in block 110 of FIG. 11.

The threshold range may be ±4 microns, i.e., ±0.004 mm. In such a configuration, the method includes comparing consecutive distance measurements and, if the second distance measurement is more than 0.004 mmm greater than or less than the first distance measurement, then the two consecutive distance measurements are identified as unnecessary measurements. If the second distance measurement is within 0.004 mm of the first distance measurement, then the first of the two consecutive distance measurements is identified as a spline measurement. The threshold range may be any suitable magnitude.

Figure 12:
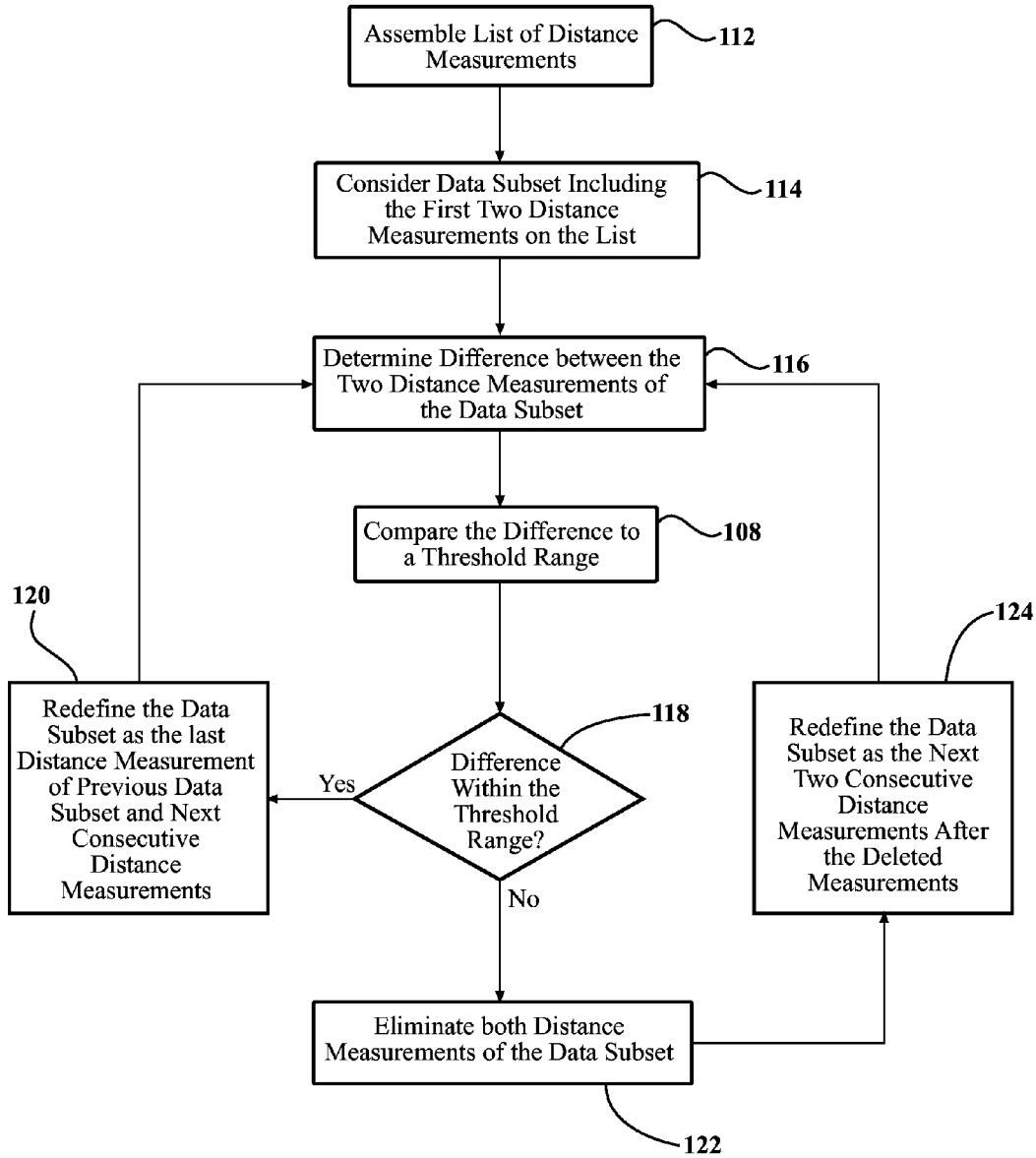
FIG. 12 is a flow chart of a method of identifying some distance measurements as spline measurements and identifying some measurements as unnecessary measurements.

The steps of comparing the difference and categorizing, as shown in blocks 108 and 110, respectively, of FIG. 11, may be further defined with the steps of FIG. 12, which may be performed by application of the algorithm to the distance measurements by the filtering software on the computer 18. The method may include assembling a list of the distance measurements, as shown in block 112 of FIG. 12. The first two consecutive distance measurements of the list are first considered as a data subset, as shown in block 114 of FIG. 12. The difference between the two distance measurements of the data subset is determined, as shown in block 116 of FIG. 12.

With continued reference to FIG. 12, the difference between the distance measurements is compared to the threshold range, as shown in block 108. As shown in decision block 118, the method includes determining whether the difference is within the threshold range. If the difference is within the threshold range, the first distance measurement of the two consecutive distance measurements is identified as a spline measurement and, as shown in block 120, the data subset is redefined as the last distance measurement of the previous data subset and the next consecutive distance measurement of the list. As shown in FIG. 12, the steps shown in blocks 116, 108, and 118 are performed on the new data subset.

With continued reference to FIG. 12, as shown in block 122, if the difference is not within the threshold range, both distance measurements of the data subset may be eliminated.

Next, as shown in block 124, the data subset is redefined as the next two consecutive distance measurements on the list. As shown in FIG. 12, the steps shown in blocks 116, 108, and 118 are performed on the new data subset.

Figure 8:
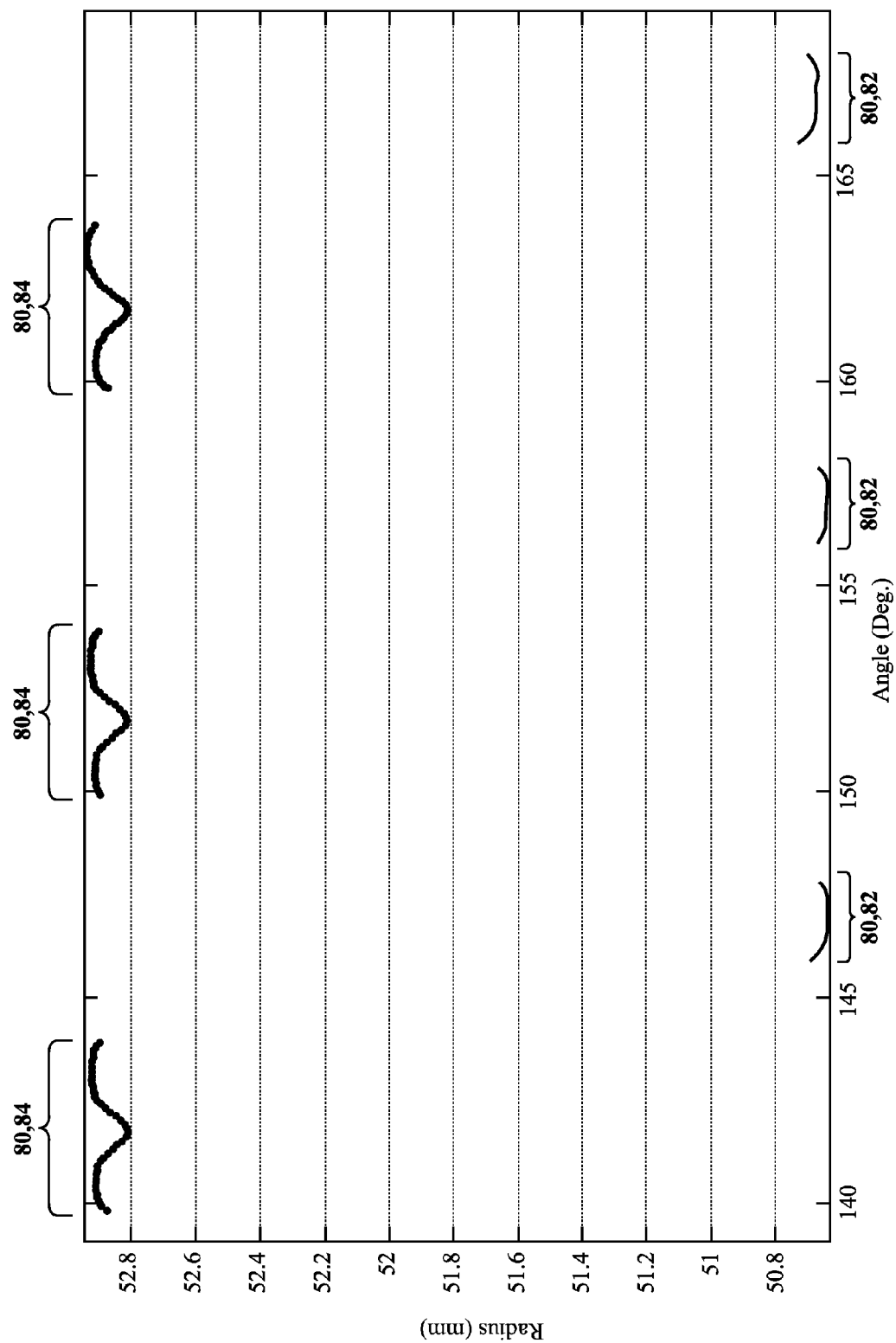
FIG. 8 is a graph showing an example of spline measurements with unnecessary measurements eliminated.
Figure 9:
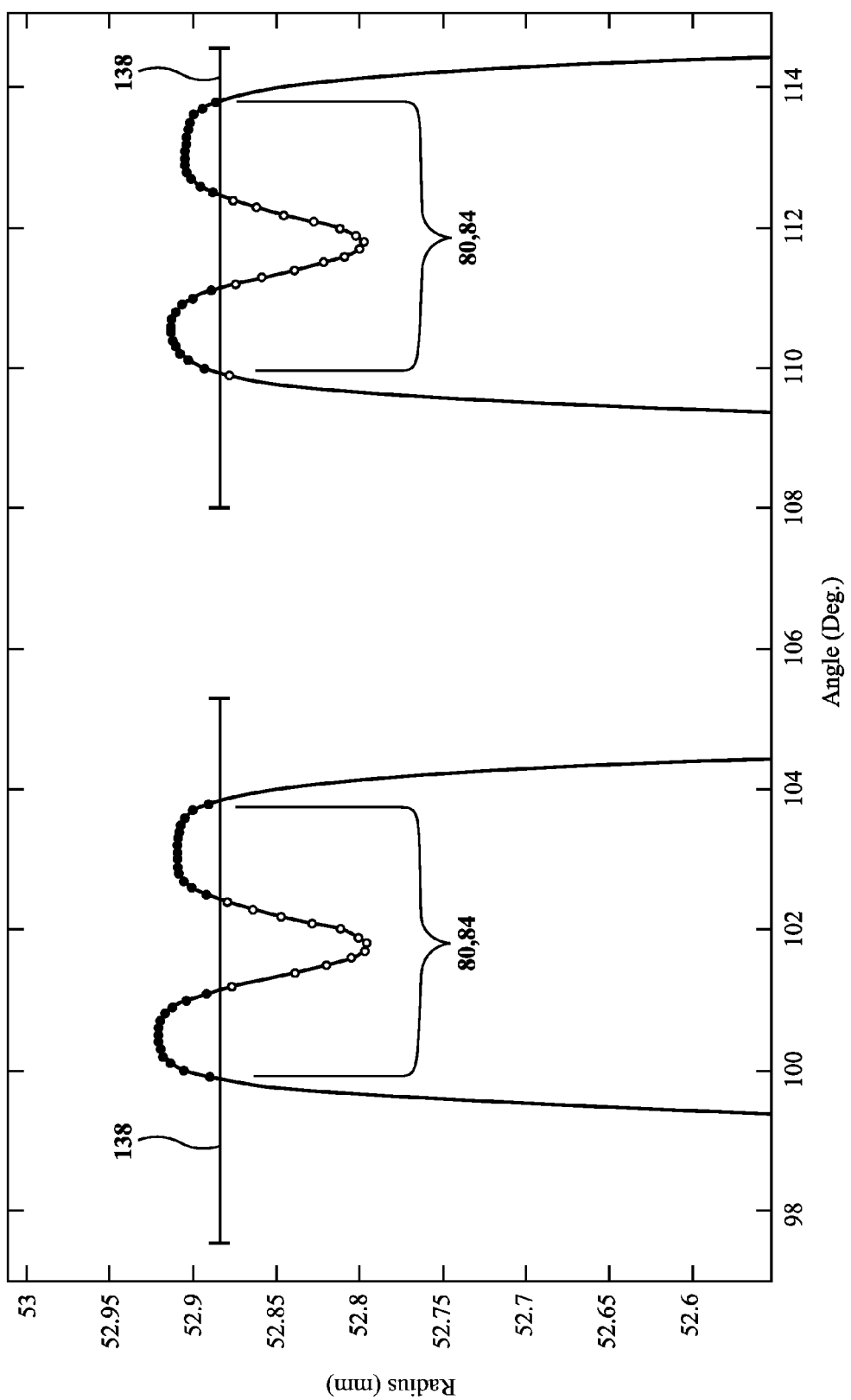
FIG. 9 is a graph showing an example of outer spline measurements and average lines.

As set forth above, the method may eliminate the unnecessary measurements from the spline measurements, as shown in block 122 of FIGS. 11 and 12. For example, the algorithm of the filtering software may delete the unnecessary measurements, leaving only the spline measurements. Alternatively, the algorithm of the filtering software may ignore the unnecessary measurements, i.e., without deleting the unnecessary measurements. As set forth above, a graphical representation of the spline measurements without the unnecessary measurements is shown in FIG. 8.

As set forth above and as shown in block 126 of FIG. 11, the method includes calculating the roundness of the part 12, e.g., clutch hub, based on the spline measurements. For example, as set forth above, the dimensional software analyze the roundness of the part 12, e.g., the clutch hub, based on the spline data.

As set forth above, the part 12 includes an inner spline 66 and an outer spline 68. The method may determine the roundness of the inner splines 66 and/or the outer splines 68 without data interference from unnecessary measurements, such as those associated with slopes 70 between the inner splines 66 and the outer splines 68, designed ridges 72, and/or holes 86. Specifically, the method may include classifying the distance measurements as outer spline measurements and inner spline measurements and calculating at least one of an outer roundness of the part 12 based on the outer spline measurements and an inner roundness of the part 12 based on the inner spline measurements. For example, the outer spline measurements and the inner spline measurements may be classified before the spline measurements are provided to the dimensional software for calculation of the roundness.

With reference to block 128 of FIG. 11, the step of classifying the distance measurements as outer spline measurements and inner spline measurements includes calculating the average of the spline measurements. The method includes categorizing the spline measurements above the average as outer spline measurements and categorizing the spline measurements below the average as inner spline measurements, as shown in block 130 of FIG. 11. Based on the outer spline measurements and the inner spline measurements categorized in block 130, the method includes calculating at least one of the outer roundness of the part 12 and the inner roundness of the part 12, respectively, as shown in block 132.

The inner spline measurements may be stored in one data array along with their position in terms of degrees and outer spline measurements may be stored in a separate data array along with their position in terms of degrees. The method may include saving the data arrays in a file for exportation to the dimensional software. For example, the data arrays may be saved in a .csv file format or .sig file format.

The method may include exporting the file including the two data arrays to the dimensional software. The method may include calculating and analyzing dimensions of the measured part 12 with the dimensional software based on the two data arrays. As set forth above, the dimension analyzed by the dimensional software may be roundness, flatness, curve, RMS roundness, sector roundness, concentricity, eccentricity, eccentric angle, centre X, centre Y, average diameter, least square circle, maximum diameter, minimum diameter, minimum inscribed, and/or maximum circumscribed, etc.

Figure 13:
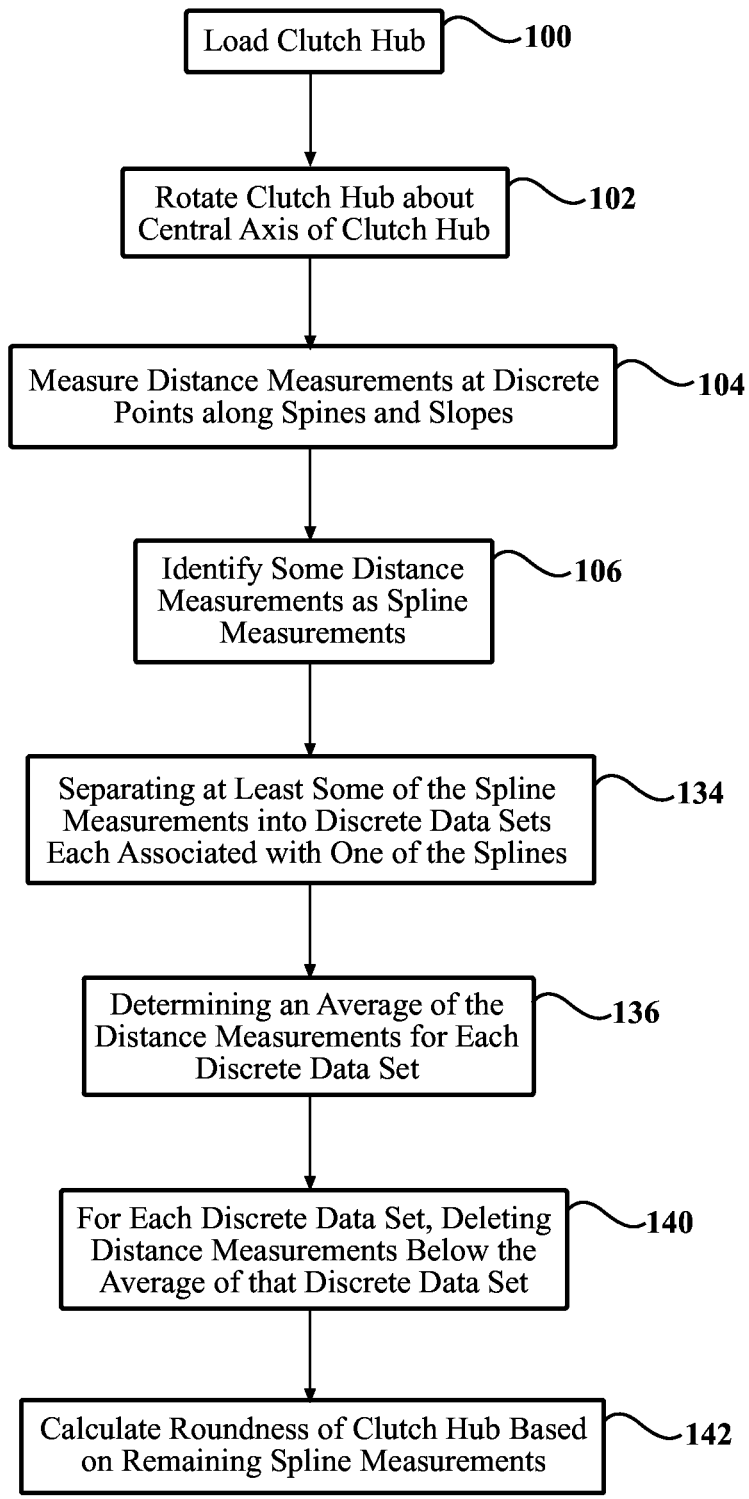
FIG. 13 is a flow chart of a method of eliminating distance measurements associated with a designed ridge in a spline.

With reference to FIG. 13, the method may eliminate distance measurements associated with the designed ridges 72. For example, in the embodiment shown in FIGS. 2 and 9, the designed ridges 72 are formed in the outer spline 68. The method may include separating the spline measurements, e.g., the outer spline measurements in the embodiment shown in the Figures, into discrete data sets each associated with one of the splines, as shown in block 134 of FIG. 12. Two such data sets are shown graphically in FIG. 9. The method may include determining an average of the distance measurements for each discrete data set, as shown in block 136. The average, for example, is graphically depicted in FIG. 9 and identified with element number 138. For each discrete data set, the method includes deleting distance measurements below the average of that discrete data set to delete the distance measurements associated with the designed ridges 72, as shown in block 140 of FIG. 13. The remaining spline measurements are then used to calculate the roundness of the part 12, as shown in block 142 of FIG. 13

As set forth above, as shown in FIG. 6, the method includes displaying the calculated dimensions on the display area 62 and the results area of the graphical user interface 44. The method includes displaying identification that the measured part 12 is within the predetermined tolerance or outside of the predetermined tolerance. For example, the method includes displaying a graph depicting the roundness of the part 12 and color coding sections of the graph as acceptable/unacceptable.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A method of verifying the roundness of a clutch hub, the method comprising:
   selecting the clutch hub after the clutch hub is manufactured on a manufacturing line;
   placing the clutch hub adjacent a non-contact measuring device;
   rotating one of the clutch hub and non-contact measuring device;
   measuring distance measurements between the non-contact measuring device and a surface of the clutch hub at discrete points along splines and slopes between the splines of the clutch hub as one of the clutch hub and non-contact measuring device is rotated;
   comparing a difference between consecutive distance measurements with a threshold range and categorizing consecutive distance measurements having a difference outside of threshold range as unnecessary measurements;
   identifying some of the distance measurements as spline measurements associated with splines of the clutch hub;
   calculating roundness of the clutch hub based on the spline measurements;
   comparing the roundness of the clutch hub to a predetermined dimensional tolerance;
   determining that the roundness is outside the predetermined dimensional tolerance; and
   as a result of determining that the roundness is outside the predetermined dimensional tolerance, scrapping the clutch hubs manufactured during the time between selecting the clutch hub from the manufacturing line and determining that the roundness is outside the predetermined dimensional tolerance.

2. The method as set forth in claim 1 further comprising identifying the distance measurements other than the spline measurements as unnecessary measurements.

3. The method as set forth in claim 2 further comprising eliminating the unnecessary measurements from the spline measurements.

4. The method as set forth in claim 1 further comprising eliminating the unnecessary measurements from the spline measurements.

5. The method as set forth in claim 1 further comprising calculating the average of the spline measurements and categorizing the spline measurements above the average as outer spline measurements and categorizing the spline measurements below the average as inner spline measurements.

6. The method as set forth in claim 5 wherein calculating roundness of the clutch hub includes calculating at least one of an outer roundness of the clutch hub based on the outer spline measurements and an inner roundness of the clutch hub based on the inner spline measurements.

7. The method as set forth in claim 1 further comprising separating the spline measurements into discrete data sets each associated with one of the splines, determining an average of the distance measurements for each discrete data set, and, for each discrete data set, deleting distance measurements below the average of that discrete data set.

8. The method as set forth in claim 1 further including classifying the distance measurements as outer spline measurements and inner spline measurements and wherein calculating roundness of the clutch hub includes calculating at least one of an outer roundness of the clutch hub based on the outer spline measurements and an inner roundness of the clutch hub based on the inner spline measurements.

9. The method as set forth in claim 1 wherein the distance measurements are measured at evenly spaced intervals of rotation of the clutch hub.

10. The method as set forth in claim 1 wherein rotating the clutch hub includes rotating the clutch hub 360 degrees.

11. The method as set forth in claim 1 wherein the clutch hub is continuously rotated during measurement of the distance measurements.

12. A system comprising:
a gage including a stage for supporting the clutch hub;
the gage including a non-contact measuring device configured to measure distance measurements between the non-contact measuring device and the clutch hub, one of the stage and non-contact measuring device being configured to provide relative rotation between the clutch hub and the non-contact measuring device for measuring distance measurements about the clutch hub; and
the gage including a computer configured to identify some of the distance measurements as spline measurements associated with the splines of the clutch hub;
the computer being configured to compare a difference between consecutive distance measurements with a threshold range and categorizing consecutive distance measurements having a difference outside of threshold range as unnecessary measurements;
the computer being configured to calculate roundness of the clutch hub based on the spline measurements;
the computer being configured to compare the roundness of the clutch hub to a predetermined dimensional tolerance;
the computer being configured to determine that the roundness is outside the predetermined dimensional tolerance;
the computer being configured to display that the clutch hub is outside of the predetermined dimensional tolerance; and
a manufacturing line from which, as a result of determining that the roundness is outside the predetermined dimensional tolerance, clutch hubs manufactured during the time between a selection of the clutch hub from the manufacturing line and determining that the roundness is outside the predetermined dimensional tolerance are scrapped.

13. The gage as set forth in claim 12 wherein the computer is configured to eliminate distance measurements other than the spline measurements.

14. The gage as set forth in claim 13 wherein the computer is configured to eliminate the unnecessary measurements from the spline measurements.

15. A system comprising:
a gage including a stage for supporting the clutch hub;
the gage including a non-contact measuring device configured to measure distance measurements between the non-contact measuring device and the clutch hub, one of the stage and non-contact measuring device being configured to provide relative rotation between the clutch hub and the non-contact measuring device for measuring distance measurements about the clutch hub; and
the gage including means for comparing a difference between consecutive distance measurements with a threshold range and categorizing consecutive distance measurements having a difference outside of threshold range as unnecessary measurements;
the gage including means for comparing the roundness of the clutch hub to a predetermined dimensional tolerance;
the gage including means for determining that the roundness is outside the predetermined dimensional tolerance; and
a manufacturing line from which, as a result of determining that the roundness is outside the predetermined dimensional tolerance, clutch hubs manufactured during the time between a selection of the clutch hub from the manufacturing line and determining that the roundness is outside the predetermined dimensional tolerance are scrapped.

16. The gage as set forth in claim 15 further comprising means for eliminating the unnecessary measurements.

* * * * *